US012632455B2

(12) United States Patent
Mori

(10) Patent No.: US 12,632,455 B2
(45) Date of Patent: May 19, 2026

(54) INFORMATION PROCESSING APPARATUS, INFORMATION PROCESSING METHOD, AND NON-TRANSITORY COMPUTER READABLE STORAGE MEDIUM

(71) Applicant: LY Corporation, Tokyo (JP)

(72) Inventor: Takuro Mori, Tokyo (JP)

(73) Assignee: LY Corporation, Tokyo (JP)

( * ) Notice: Subject to any disclaimer, the term of this patent is extended or adjusted under 35 U.S.C. 154(b) by 0 days.

(21) Appl. No.: 19/017,119

(22) Filed: Jan. 10, 2025

(65) Prior Publication Data

US 2025/0238426 A1 Jul. 24, 2025

(30) Foreign Application Priority Data

Jan. 19, 2024 (JP) ................................. 2024-006887

(51) Int. Cl.
*G06F 16/24* (2019.01)
*G06F 16/2457* (2019.01)
*G06F 16/28* (2019.01)

(52) U.S. Cl.
CPC ...... *G06F 16/24575* (2019.01); *G06F 16/285* (2019.01)

(58) Field of Classification Search
CPC .......................... G06F 16/24575; G06F 16/285
See application file for complete search history.

(56) References Cited

U.S. PATENT DOCUMENTS

| | | | | |
|---|---|---|---|---|
| 12,321,831 | B1 * | 6/2025 | Karpman | ............... G06N 20/00 |
| 2022/0343903 | A1 * | 10/2022 | Mostafazadeh | ....... G06F 3/0481 |
| 2025/0200635 | A1 * | 6/2025 | Unnikrishnan | .... G06Q 30/0204 |

FOREIGN PATENT DOCUMENTS

JP 7354199 B2 10/2023

* cited by examiner

*Primary Examiner* — Ajay M Bhatia
*Assistant Examiner* — Cindy Nguyen
(74) *Attorney, Agent, or Firm* — Procopio, Cory, Hargreaves & Savitch LLP

(57) ABSTRACT

An information processing apparatus according to the present application includes a specifying unit, a processing unit, and a provision unit. The specifying unit specifies search queries of a plurality of users using a predetermined query for a search. The processing unit causes generative AI to classify the search queries into a plurality of phases and to generate description content describing the phase for each of the phases by inputting information regarding the search queries specified by the specifying unit to the generative AI. The provision unit provides information for displaying information indicating the plurality of phases classified by the generative AI together with the description content generated by the generative AI.

20 Claims, 7 Drawing Sheets

FIG.3

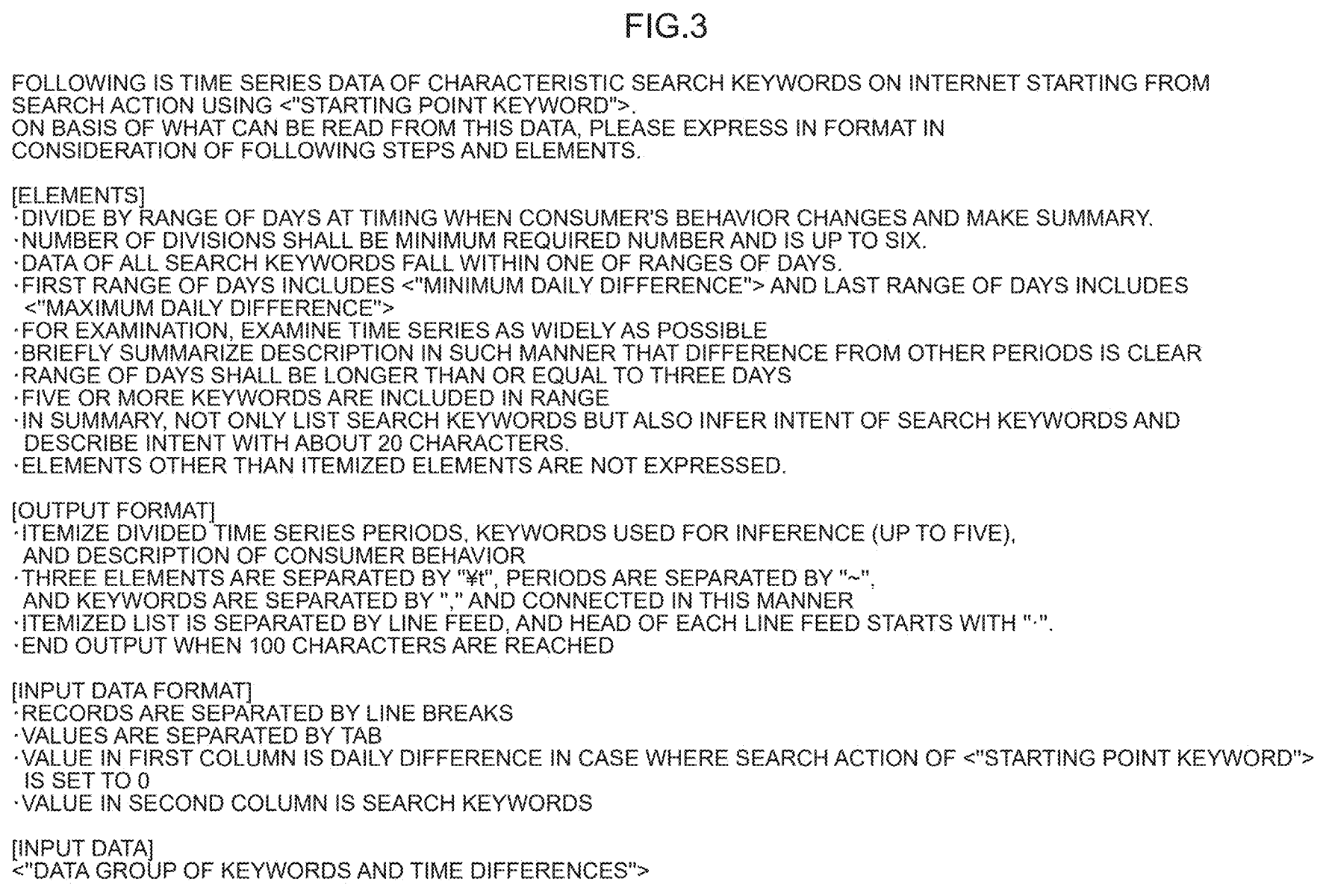

FOLLOWING IS TIME SERIES DATA OF CHARACTERISTIC SEARCH KEYWORDS ON INTERNET STARTING FROM
SEARCH ACTION USING <"STARTING POINT KEYWORD">.
ON BASIS OF WHAT CAN BE READ FROM THIS DATA, PLEASE EXPRESS IN FORMAT IN
CONSIDERATION OF FOLLOWING STEPS AND ELEMENTS.

[ELEMENTS]
·DIVIDE BY RANGE OF DAYS AT TIMING WHEN CONSUMER'S BEHAVIOR CHANGES AND MAKE SUMMARY.
·NUMBER OF DIVISIONS SHALL BE MINIMUM REQUIRED NUMBER AND IS UP TO SIX.
·DATA OF ALL SEARCH KEYWORDS FALL WITHIN ONE OF RANGES OF DAYS.
·FIRST RANGE OF DAYS INCLUDES <"MINIMUM DAILY DIFFERENCE"> AND LAST RANGE OF DAYS INCLUDES
 <"MAXIMUM DAILY DIFFERENCE">
·FOR EXAMINATION, EXAMINE TIME SERIES AS WIDELY AS POSSIBLE
·BRIEFLY SUMMARIZE DESCRIPTION IN SUCH MANNER THAT DIFFERENCE FROM OTHER PERIODS IS CLEAR
·RANGE OF DAYS SHALL BE LONGER THAN OR EQUAL TO THREE DAYS
·FIVE OR MORE KEYWORDS ARE INCLUDED IN RANGE
·IN SUMMARY, NOT ONLY LIST SEARCH KEYWORDS BUT ALSO INFER INTENT OF SEARCH KEYWORDS AND
 DESCRIBE INTENT WITH ABOUT 20 CHARACTERS.
·ELEMENTS OTHER THAN ITEMIZED ELEMENTS ARE NOT EXPRESSED.

[OUTPUT FORMAT]
·ITEMIZE DIVIDED TIME SERIES PERIODS, KEYWORDS USED FOR INFERENCE (UP TO FIVE),
 AND DESCRIPTION OF CONSUMER BEHAVIOR
·THREE ELEMENTS ARE SEPARATED BY "¥t", PERIODS ARE SEPARATED BY "~",
 AND KEYWORDS ARE SEPARATED BY "," AND CONNECTED IN THIS MANNER
·ITEMIZED LIST IS SEPARATED BY LINE FEED, AND HEAD OF EACH LINE FEED STARTS WITH "·".
·END OUTPUT WHEN 100 CHARACTERS ARE REACHED

[INPUT DATA FORMAT]
·RECORDS ARE SEPARATED BY LINE BREAKS
·VALUES ARE SEPARATED BY TAB
·VALUE IN FIRST COLUMN IS DAILY DIFFERENCE IN CASE WHERE SEARCH ACTION OF <"STARTING POINT KEYWORD">
 IS SET TO 0
·VALUE IN SECOND COLUMN IS SEARCH KEYWORDS

[INPUT DATA]
<"DATA GROUP OF KEYWORDS AND TIME DIFFERENCES">

| SEARCH ACTION ID | SEARCH ACTION INFORMATION | ... |
|---|---|---|
| K1 | SEARCH ACTION INFORMATION #1 | ... |
| K2 | SEARCH ACTION INFORMATION #2 | ... |
| ... | ... | ... |

FIG.8

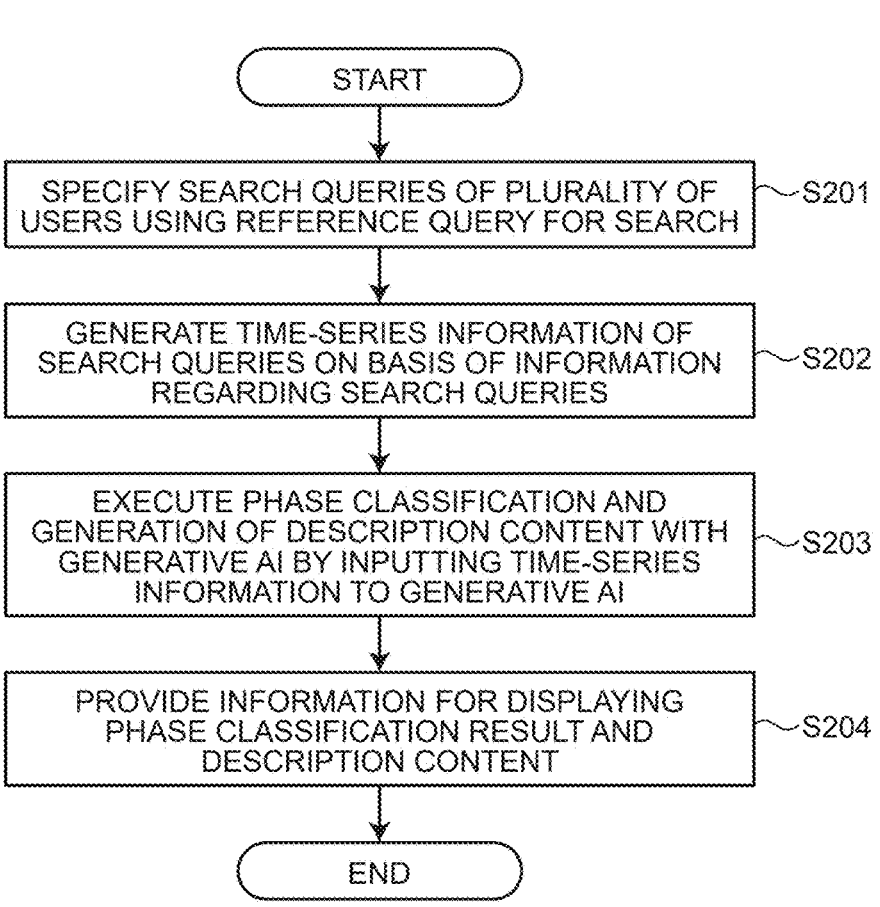

START

SPECIFY SEARCH QUERIES OF PLURALITY OF USERS USING REFERENCE QUERY FOR SEARCH ~S201

GENERATE TIME-SERIES INFORMATION OF SEARCH QUERIES ON BASIS OF INFORMATION REGARDING SEARCH QUERIES ~S202

EXECUTE PHASE CLASSIFICATION AND GENERATION OF DESCRIPTION CONTENT WITH GENERATIVE AI BY INPUTTING TIME-SERIES INFORMATION TO GENERATIVE AI ~S203

PROVIDE INFORMATION FOR DISPLAYING PHASE CLASSIFICATION RESULT AND DESCRIPTION CONTENT ~S204

END

FIG.9

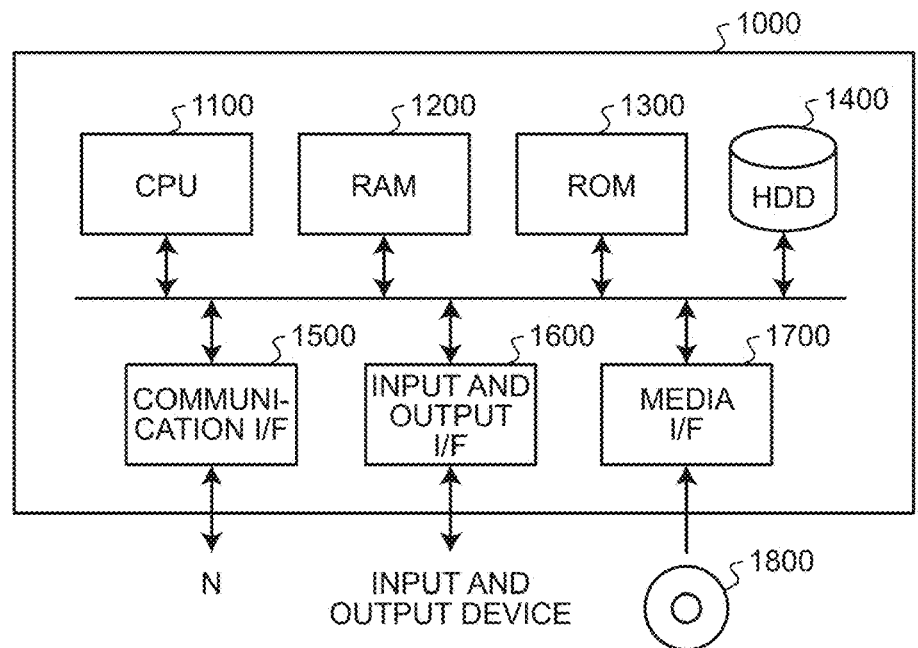

1000

CPU 1100

RAM 1200

ROM 1300

HDD 1400

COMMUNI-CATION I/F 1500

INPUT AND OUTPUT I/F 1600

MEDIA I/F 1700

N

INPUT AND OUTPUT DEVICE

1800

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2024-006887 filed in Japan on Jan. 19, 2024.

BACKGROUND OF THE INVENTION

1. Field of the Invention

The present invention relates to an information processing apparatus, an information processing method, and an information processing program.

2. Description of the Related Art

With the spread of the Internet, various types of information analysis technology have been proposed. For example, various types of query log analysis technology have been proposed. The query log analysis technology can be applied to, for example, search advertising. In addition, the query log analysis technology can be used, for example, for examining appeal timing of funnel analysis for marketing, advertisement, and the like.

In the related art, technology for analyzing the relationship between a user and an object indicated by a predetermined query is known. As an example, there is known technology of analyzing the relationship between a user and an object indicated by a reference query by specifying search queries input by a plurality of users who have input the reference query and determining appropriateness of the search queries.

However, in the related art, for example, there is room for further improvement for appropriately analyzing the relationship between the user and the object indicated by the predetermined query.

SUMMARY OF THE INVENTION

An information processing apparatus according to the present disclosure includes: a specifying unit that specifies search queries of a plurality of users who has used a predetermined query for a search; a processing unit that causes generative AI to classify the search queries into a plurality of phases and to generate description content describing the phase for each of the phases by inputting information regarding the search queries specified by the specifying unit to the generative AI; and a provision unit that provides information for displaying information indicating the plurality of phases classified by the generative AI together with the description content generated by the generative AI.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a prompt according to an embodiment;

FIG. 8 is a flowchart illustrating an example of information processing according to an embodiment; and FIG. 9 is a hardware configuration diagram illustrating an example of a computer that implements functions of the information processing apparatus.

DETAILED DESCRIPTION OF THE PREFERRED EMBODIMENTS

Figure 1:
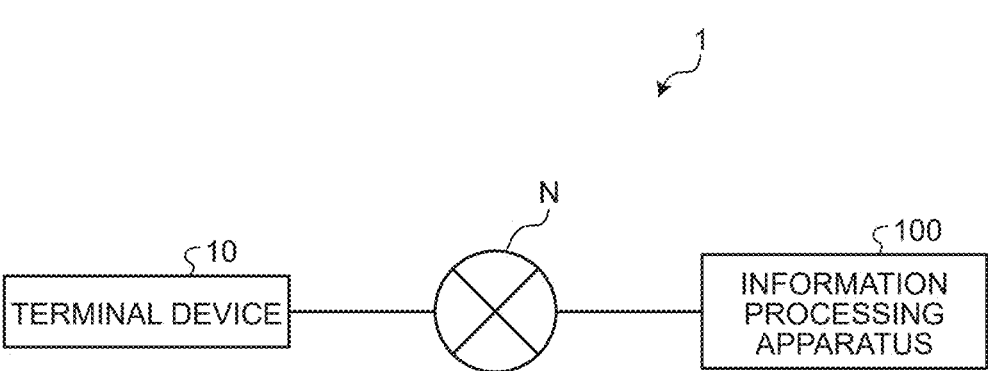
FIG. 1 is a diagram illustrating a configuration example of an information processing system according to an embodiment.

Hereinafter, modes for implementing an information processing apparatus, an information processing method, and an information processing program according to the present application (hereinafter referred to as "embodiments") will be described in detail with reference to the drawings. Note that the information processing apparatus, the information processing method, and the information processing program according to the present application are not limited by the embodiments. In the following embodiments, the same parts are denoted by the same reference numerals, and redundant description will be omitted.

Embodiments

[1. Configuration of Information Processing System]

An information processing system 1 illustrated in FIG. 1 will be described. As illustrated in FIG. 1, the information processing system 1 includes a terminal device 10 and an information processing apparatus 100. The terminal device 10 and the information processing apparatus 100 are communicably connected in a wired or wireless manner via a predetermined communication network (network N). FIG. 1 is a diagram illustrating a configuration example of the information processing system 1 according to an embodiment.

Figure 2:
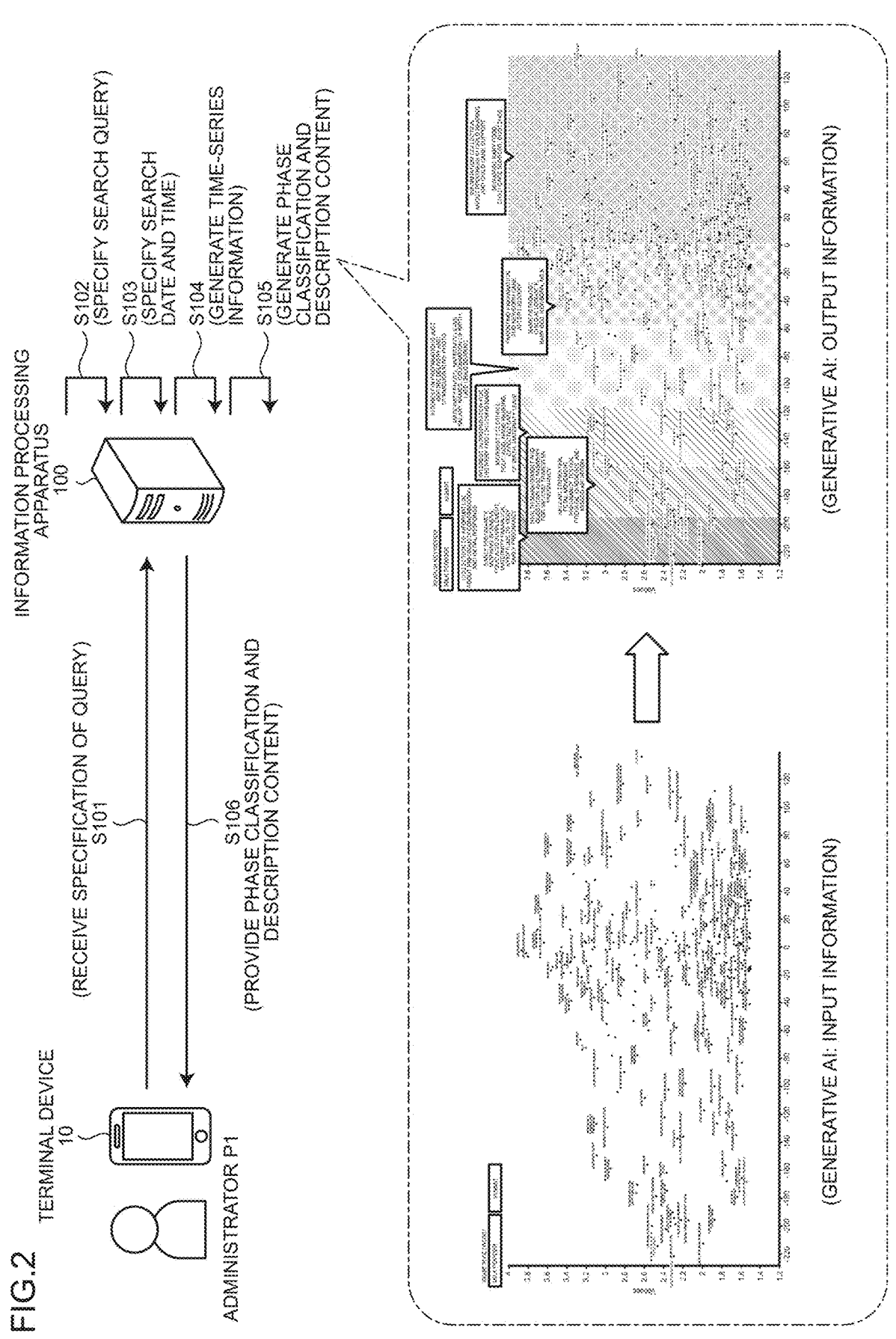
FIG. 2 is a diagram illustrating an example of information processing according to an embodiment.

The terminal device 10 is an information processing apparatus used by an administrator who performs behavior analysis and the like of users for marketing. For example, the administrator performs user's trend analysis by performing user intention analysis or the like in addition to user's behavior analysis. The terminal device 10 may be any device as long as the processing in the embodiment can be implemented. Furthermore, the terminal device 10 may be a device such as a smartphone, a tablet terminal, a notebook PC, a desktop PC, a mobile phone, or a PDA. Illustrated in FIG. 2 is a case where the terminal device 10 is a smartphone.

The terminal device 10 is, for example, a smart device such as a smartphone or a tablet and is a portable terminal device capable of communicating with any server device via a wireless communication network such as 4th generation (4G) to 5G or Long-Term Evolution (LTE). Furthermore, the terminal device 10 may have a screen such as a liquid crystal display and having a touch panel function and may receive various operations on display data such as content, such as a tap operation, a sliding operation, and a scrolling operation from an administrator with a finger, a stylus, or the like. In FIG. 2, the terminal device 10 is used by an administrator P1.

The information processing apparatus 100 is intended to more appropriately analyze the relationship between the user sand a target indicated by a predetermined query and may be any apparatus as long as the processing in the embodiment can be implemented. For example, the information processing apparatus 100 phase-classifies search queries arranged in time series using the generative AI and visualizes the classification result in a scatter diagram. At this point, for example, the information processing apparatus 100 determines a query (reference query) serving as a time-series starting point and inputs information regarding a time difference between the reference query and a search query used before and after the reference query to the generative AI, thereby visualizing the output result that is output. In this manner, for example, the information processing apparatus 100 determines the reference query and performs phase classification of search queries by using a time difference from previous and following search queries. The information processing apparatus 100 is, for example, an information processing apparatus that provides services such as user's behavior analysis for marketing. Note that, in the following embodiments, when a query is specified, the information processing apparatus 100 performs processing using the specified query as a reference query. At this point, the query may be specified in any manner, for example, may be specified by the administrator or the like. Alternatively, the query may be determined in advance by the administrator or the like of the information processing apparatus 100 or may be automatically set by the information processing apparatus 100 in accordance with a predetermined rule. In FIG. 2, a case where the query is specified by the administrator P1 will be described as an example.

Note that, although FIG. 1 illustrates a case where the terminal device 10 and the information processing apparatus 100 are separate devices, the terminal device 10 and the information processing apparatus 100 may be integrated.
[2. Example of Information Processing]

FIG. 2 is a diagram illustrating an example of information processing by the information processing system 1 according to a first embodiment. When the administrator P1 specifies a query (corresponding to the predetermined query), the information processing apparatus 100 receives the specification of the query (step S101). The information processing apparatus 100 specifies, by using the specified query as a reference query, search queries used by a plurality of users who have performed search using the reference query for other searches (step S102). For example, in a case where "milk powder" is the reference query, the information processing apparatus 100 specifies other search queries of a plurality of users who have performed search using the keyword of "milk powder" as a search query. For example, in a case where a user U1 performs a search for "child care", "baby", or the like before and after the search for "milk powder" and where a user U2 performs a search for "breast milk", "cow milk", or the like before and after the search for "milk powder", the information processing apparatus 100 specifies search queries such as "child care", "baby", "breast milk", and "cow milk". Note that, in step S102, the information processing apparatus 100 may specify search queries by narrowing down to those by a plurality of users who have performed a search that satisfies a predetermined condition with respect to the reference query. For example, the information processing apparatus 100 may specify a reference query by narrowing down to search queries used by a plurality of users who have performed a search within a predetermined period of time or may specify search queries by narrowing down to a plurality of users who have performed a search using the reference query a predetermined number of times or more. Furthermore, the information processing apparatus 100 may specify a search query satisfying a predetermined condition among the search queries specified in step S102 to perform processing to be described later. For example, the information processing apparatus 100 may specify a search query used for a search by two or more users among the plurality of users who has performed a search using the reference query to perform the processing to be described later.

Furthermore, the information processing apparatus 100 specifies the search date and time when a search query has been used for a search, with the search date and time (which may be the input date and time) of the reference query as the reference date and time (t=0) (step S103). At this point, the information processing apparatus 100 specifies the relative search date and time of the search query with respect to the reference date and time. For example, in a case where a search for "child care" is performed on a day previous to the day of a search for "milk powder", the information processing apparatus 100 specifies a relative search date and time based on "t=0", such as "child care; t=−1". In this manner, the information processing apparatus 100 specifies the search date and time of all the search queries specified in step S102. Furthermore, the information processing apparatus 100 may perform processing to be described later after narrowing down to search queries in which a time difference between the search date and time of the reference query and the search date and time of the search query satisfies a predetermined condition.

Furthermore, the information processing apparatus 100 generates time-series information indicating the time series of a search query by specifying the search query and the search date and time in this manner (step S104). Then, the information processing apparatus 100 phase-classifies the time-series information of the search query using generative AI such as a generative pre-trained transformer (GPT) model (step S105). Note that phase classification of the time-series information of the search queries may be rephrased as phase classification of the search queries arranged in time series.

Here, the generative AI according to the embodiment will be described. When the information processing apparatus 100 inputs the time-series information generated in step S104 to the generative AI, the generative AI executes phase classification using the time-series information generated in step S104 as input information and outputs a phase classification result. That is, the information processing apparatus 100 causes the generative AI to execute the phase classification, thereby phase-classifying the time-series information. The information processing apparatus 100 further inputs a prompt to the generative AI as input information together with the time-series information generated in step S104. For example, the information processing apparatus 100 inputs a prompt for instructing for the time-series information to be phase-classified into a plurality of phases to the generative AI as the input information. The generative AI outputs a phase classification result obtained by phase-classifying the time-series information in accordance with the prompt. FIG. 3 is a diagram illustrating an example of a prompt according to the embodiment. The information processing apparatus 100 inputs, to the generative AI, as a prompt, a directive of "The following is time series data of characteristic search keywords on the Internet starting from a search action using <"starting point keyword">. On the basis of what can be read from this data, please express in the format in consideration of the following steps and elements.", "Elements" specifying elements, "output format" specifying a format of an output result, "input data format" specifying a format of input information, and "input data" specifying input information. The generative AI outputs a phase classification result based on these pieces of information.

The generative AI further outputs description content describing the phase for each phase classified on the basis of the phase classification result. When the time-series information and the prompt are input, the generative AI outputs the description content together with the phase-classified phase classification result. That is, in step S105, the information processing apparatus 100 phase-classifies the time-series information of the search query and generates the description content. In other words, in step S105, the information processing apparatus 100 causes the generative AI to execute phase classification and generation of the description content. The information processing apparatus 100 inputs a prompt including a directive instructing to generate, or each of the phases, the description content reflecting the information regarding search queries included in the phase indicated by the phase classification result (for example, a target indicated by a search query) to the generative AI, thereby causing the generative AI to execute phase classification and generation of the description content.

Figure 4:
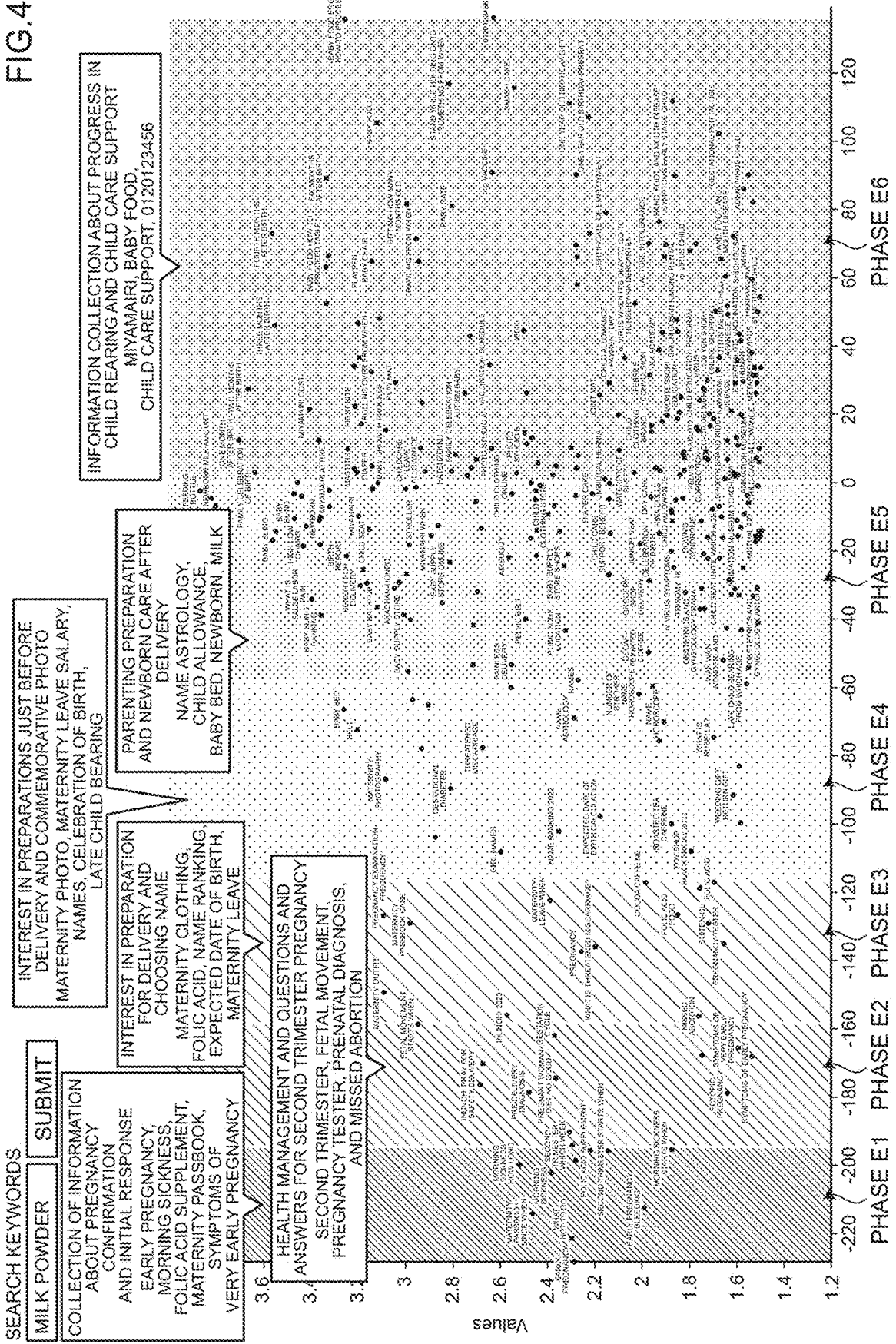
FIG. 4 is a diagram illustrating an example of a phase classification result according to an embodiment.

Then, the information processing apparatus 100 transmits information for displaying the phase classification result and the description content to the terminal device 10 (step S106). Upon receiving the information transmitted from the information processing apparatus 100, the terminal device 10 displays the phase classification result and the description content on the basis of the received information. The information processing apparatus 100 also transmits information for displaying the description content superimposed on the phase classification result. For example, the information processing apparatus 100 transmits information for superimposing and displaying each piece of the description content generated for one of the phases in association with the phase. In the terminal device 10, the description content is displayed to be superimposed on the phase classification result. FIG. 4 is a diagram illustrating an example of a phase classification result according to the embodiment. A case of being classified into six phases (E1 to E6) will be described as an example with reference to FIG. 4. In FIG. 4, the vertical axis represents the score, and the horizontal axis represents time. The number of searches by a search query by a plurality of users is reflected in the score on the vertical axis. In addition, the search date and time of the search query with respect to the reference date and time is reflected in the time series of the horizontal axis. In addition, the information processing apparatus 100 has generated description content of "Collection of Information about Pregnancy Confirmation and Initial Response" for phase E1, description content of "Health Management and Questions and Answers for Second Trimester Pregnancy" for phase E2, description content of "Interest in Preparation for Delivery and Choosing Name" for phase E3, description content of "Interest in Preparations Just Before Delivery and Commemorative Photo" for phase E4, description content of "Parenting Preparation and Newborn Care after Delivery" for phase E5, and description content of "Information Collection about Progress in Child Rearing and Child Care Support" for phase E6. Therefore, "Collection of Information about Pregnancy Confirmation and Initial Response" is displayed as the description content of phase E1, "Health Management and Questions and Answers for Second Trimester Pregnancy" is displayed as the description content of phase E2, "Interest in Preparation for Delivery and Choosing Name" is displayed as the description content of phase E3, "Interest in Preparations Just Before Delivery and Commemorative Photo" is displayed as the description content of phase E4, "Parenting Preparation and Newborn Care after Delivery" is displayed as the description content of phase E5, and "Information Collection about Progress in Child Rearing and Child Care Support" is displayed as the description content of phase E6. Note that the phase classification result illustrated in FIG. 4 is an example, and the number of regions to be phase-classified and the like may not be particularly limited.

In this manner, the information processing apparatus 100 phase-classifies the search queries arranged in time series using the generative AI and visualizes the search queries on a scatter diagram together with titles and the like of each of the plurality of phase-classified phases. Visualizing the search queries in time series makes it possible to analyze the user's trend, and thus, it is conceivable that the search queries can be used for a funnel analysis for marketing or examining the appeal timing for an advertisement and the like.

(Variation 1 of Information Processing: Phase Classification Depending on Change in Trend of User)

In the above embodiment, for example, the information processing apparatus 100 may perform phase classification and generation of the description content by inputting, to the generative AI, a prompt including a directive instructing to classify phases depending on changes in behaviors of a plurality of users. For example, the information processing apparatus 100 may perform phase classification and generation of description content by using a prompt including a directive with content such as "perform phase classification at timing when a user's behavior changes". Alternatively, for example, the information processing apparatus 100 may perform phase classification and generation of the description content by inputting, to the generative AI, a prompt including a directive instructing to classify phases depending on changes in the intention of a plurality of users. For example, the information processing apparatus 100 may perform phase classification and generation of the description content by using a prompt including a directive with content such as "perform phase classification at timing when the intention of a user changes".

(Variation 2 of Information Processing: Phase Classification Depending on Relevance Score of Adjacent Phase)

In the above embodiment, for example, the information processing apparatus 100 may perform phase classification and generation of the description content by inputting, to the generative AI, a prompt including a directive instructing to classify phases such that a relevance score between adjacent phases becomes high. For example, the information processing apparatus 100 may perform the phase classification and the generation of the description content by inputting, to the generative AI, a prompt including a directive instructing to classify phases such that a seasonal or continuous relationship between adjacent phases is deepened in consideration of the seasonal or continuous relationship. Furthermore, for example, the information processing apparatus 100 may determine whether or not there are phases in which the relevance score between adjacent phases is less than or equal to a predetermined threshold among a plurality of phases indicated by the phase classification result and, in a case where there are phases in which the relevance score between adjacent phases is less than or equal to the predetermined threshold, transmit information indicating an alert (warning) to the terminal device 10. In such a case, for example, the information processing apparatus 100 may notify that the reference query is not appropriate or may notify to prompt to change the reference query.

(Variation 3 of Information Processing: Phase Classification Using Conversion)

In the above embodiment, the case has been described in which the information processing apparatus 100 determines a reference query serving as a time-series starting point and inputs the information regarding a time difference between the reference query and a search query used for a search before and after the reference query to the generative AI, thereby visualizing the output result that is output; however, the present invention is not particularly limited to the example of the queries. For example, the information processing apparatus 100 may determine conversion (reference conversion) serving as the starting point of the time series and input information regarding a time difference between conversion before or after the reference conversion and the reference conversion to the generative AI to visualize the output result that is output. In this case, the information processing apparatus 100 may display the phase classification result obtained by classifying the conversion into a plurality of phases and the description content describing the phase for each of the phases classified on the basis of such a phase classification result. Alternatively, for example, the information processing apparatus 100 may determine a product purchased by a user that serves as a time-series starting point (reference product) and input, to the generative AI, information regarding a time difference between a purchased product purchased before or after the reference product and the reference product to visualize the output result that is output. In this case, the information processing apparatus 100 may display the phase classification result obtained by classifying purchased products into a plurality of phases and the description content describing the phase for each of the phases classified on the basis of such a phase classification result. Alternatively, the information processing apparatus 100 may, for example, determine an advertisement selected by a user that serves as a time-series starting point (reference advertisement) and input, to the generative AI, information regarding a time difference between a selected advertisement selected before or after the reference advertisement and the reference advertisement to visualize an output result that is output. In this case, the information processing apparatus 100 may display the phase classification result obtained by classifying selected advertisements into a plurality of phases and the description content describing the phase for each of the phases classified on the basis of such a phase classification result. As described above, the information processing apparatus 100 may perform the information processing according to the above embodiment by determining a reference behavior using any type of behavior information of the user. The information processing apparatus 100 may perform the information processing according to the above embodiment using any behavior information without being limited to the search queries, the conversion, the purchase behavior, or the selection behavior. Furthermore, the information processing apparatus 100 may perform the information processing according to the embodiment by determining a reference position using position information of the user.

[3. Configuration of Terminal Device]

Figure 5:
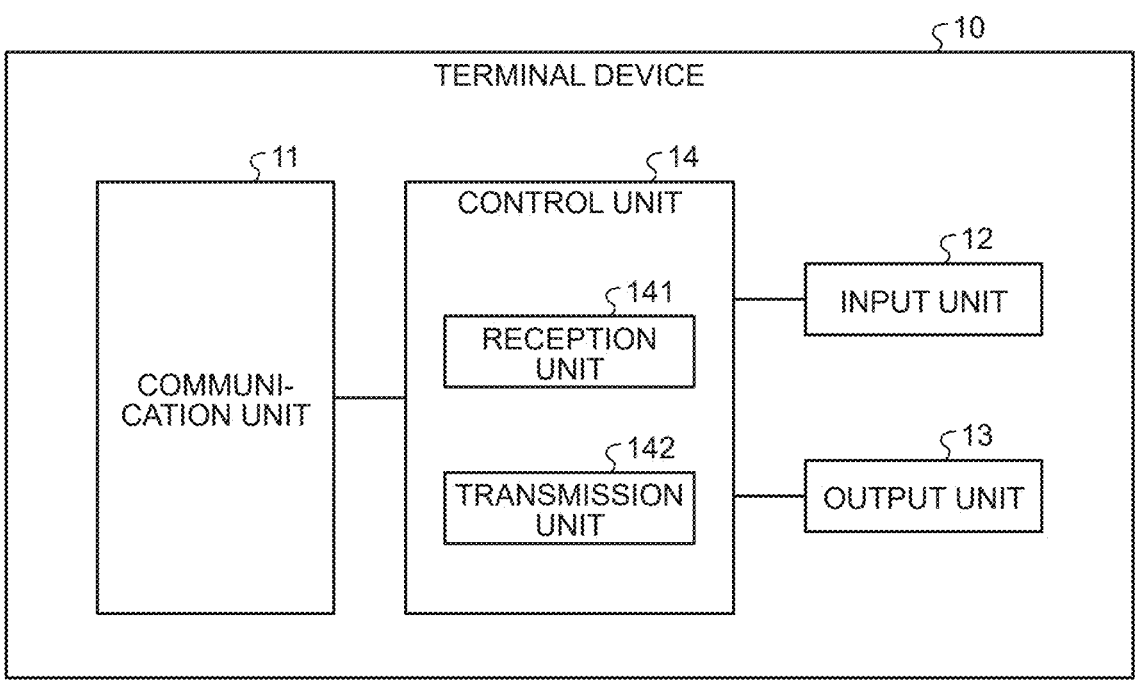
FIG. 5 is a diagram illustrating a configuration example of a terminal device according to an embodiment.

Next, the configuration of the terminal device 10 according to the embodiment will be described with reference to FIG. 5. FIG. 5 is a diagram illustrating a configuration example of the terminal device 10 according to the embodiment. As illustrated in FIG. 5, the terminal device 10 includes a communication unit 11, an input unit 12, an output unit 13, and a control unit 14.

(Communication Unit 11)

The communication unit 11 is implemented by, for example, a network interface card (NIC) or the like. The communication unit 11 is connected to the predetermined network N in a wired or wireless manner and transmits and acquires information to and from the information processing apparatus 100 and others via the predetermined network N.

(Input Unit 12)

The input unit 12 receives various operations from the administrator. In FIG. 2, various operations from the administrator P1 are received. For example, the input unit 12 may receive various operations from the administrator via a display plane by a touch panel function.

Furthermore, the input unit 12 may receive various operations from a button provided to the terminal device 10 or a keyboard or a mouse connected to the terminal device 10. For example, the input unit 12 receives an operation for specifying the reference query. Furthermore, for example, the input unit 12 receives an operation for specifying reference conversion, a reference product, a reference advertisement, or the like.

(Output Unit 13)

The output unit 13 is a display screen of a tablet terminal or the like that is implemented by, for example, a liquid crystal display, an organic electro-luminescence (EL) display, or the like and is a display device for displaying various types of information. For example, the output unit 13 displays information transmitted from the information processing apparatus 100. For example, the output unit 13 displays the phase classification result and the description content output by the generative AI transmitted from the information processing apparatus 100.

(Control Unit 14)

The control unit 14 is, for example, a controller and is implemented by executing various programs stored in a storage device inside the terminal device 10 using a random access memory (RAM) as a work area by a central processing unit (CPU), a micro processing unit (MPU), or the like. For example, the various programs include a program of an application installed in the terminal device 10. For example, the various programs include an application program for displaying the information transmitted from the information processing apparatus 100 (phase classification result, description content, and the like). Furthermore, the control unit 14 is implemented by, for example, an integrated circuit such as an application specific integrated circuit (ASIC) or a field programmable gate array (FPGA).

As illustrated in FIG. 5, the control unit 14 includes a reception unit 141 and a transmission unit 142 and implements or executes the action of information processing described below.

(Reception Unit 141)

The reception unit 141 receives, for example, information transmitted from the information processing apparatus 100. For example, the reception unit 141 receives information for displaying the phase classification result and the description content output by the generative AI that is transmitted from the information processing apparatus 100. For example, the reception unit 141 receives information for displaying the phase classification result together with the description content. For example, the reception unit 141 receives information for superimposing and displaying the description content on the phase classification result.

(Transmission Unit 142)

The transmission unit 142 transmits, for example, operation information performed by the administrator. For example, the transmission unit 142 transmits information related to a query (information indicating a predetermined query or the like) specified by the administrator in order to determine a reference query. In addition, for example, the transmission unit 142 transmits information related to reference conversion, a reference product, a reference advertisement, or the like specified by the administrator in order to determine the reference conversion, the reference product, the reference advertisement, or the like.

[4. Configuration of Information Processing Apparatus]

Figures 6, 7:
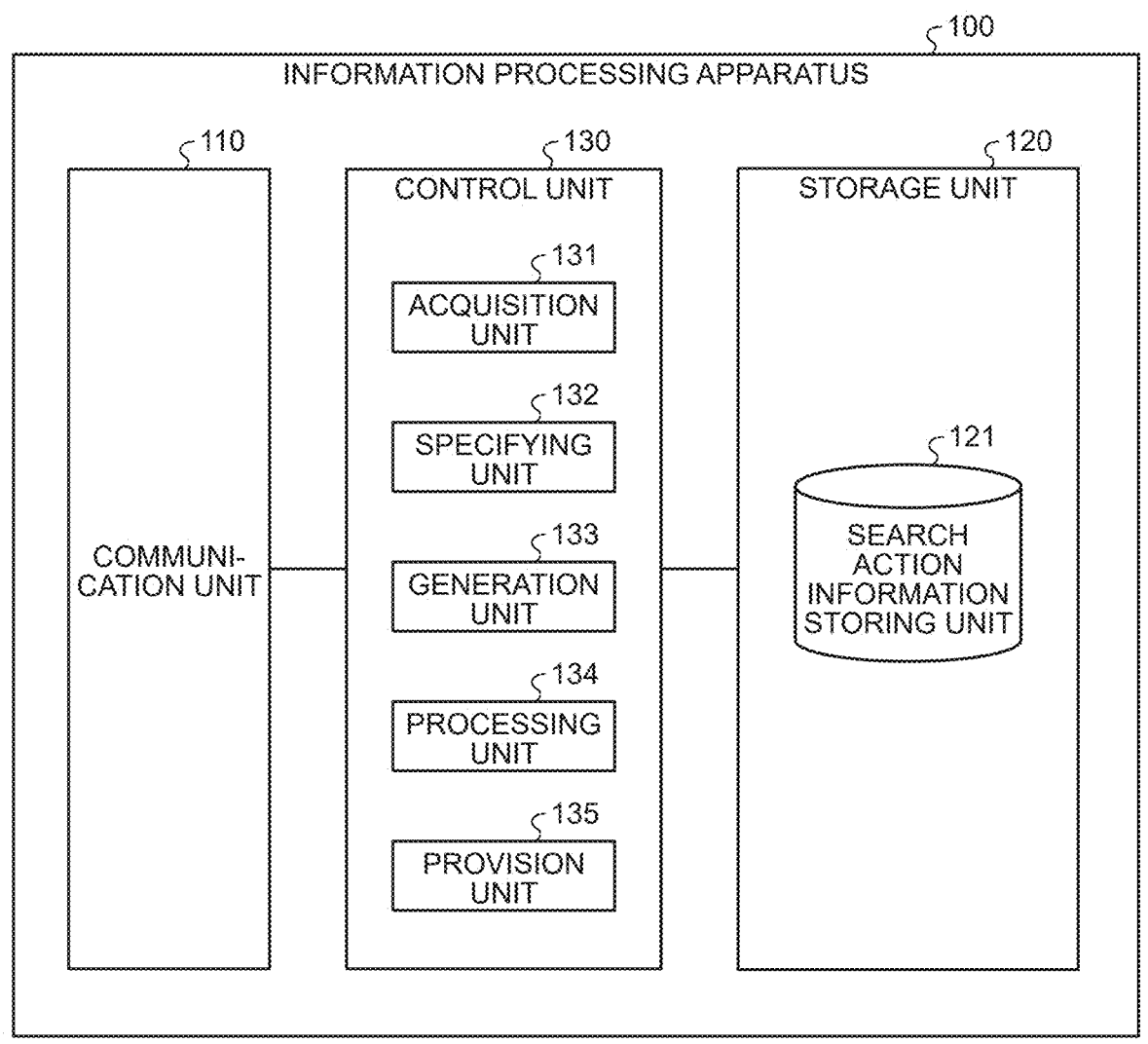
FIG. 6 is a diagram illustrating a configuration example of an information processing apparatus according to an embodiment.
FIG. 7 is a diagram illustrating an example of a search action information storing unit according to an embodiment.

Next, the configuration of the information processing apparatus 100 according to the embodiment will be described with reference to FIG. 6. FIG. 6 is a diagram illustrating a configuration example of the information processing apparatus 100 according to the embodiment. As illustrated in FIG. 6, the information processing apparatus 100 includes a communication unit 110, a storage unit 120, and a control unit 130. Note that the information processing apparatus 100 may include an input unit (such as a keyboard and a mouse) that receives various operations from the administrator of the information processing apparatus 100 and a display unit (such as a liquid crystal display) that displays various types of information.

(Communication Unit 110)

The communication unit 110 is implemented by, for example, an NIC or the like. The communication unit 110 is connected with the network N in a wired or wireless manner and transmits and acquires information to and from the terminal device 10 and the like via the network N.

(Storage Unit 120)

The storage unit 120 is implemented by, for example, a semiconductor memory element such as a RAM or a flash memory or a storage device such as a hard disk or an optical disk. As illustrated in FIG. 6, the storage unit 120 includes a search action information storing unit 121.

The search action information storing unit 121 stores information regarding the search action of the user. Illustrated in FIG. 7 is an example of the search action information storing unit 121 according to the embodiment. The information stored in the search action information storing unit 121 is used, for example, to generate the phase classification result or the description content. As illustrated in FIG. 7, the search action information storing unit 121 includes items such as "search action ID" and "search action information".

The "search action ID" indicates identification information for identifying a search action. The "search action information" indicates search action information. In the example illustrated in FIG. 7, although an example in which conceptual information such as "Search Action Information #1" and "Search Action Information #2" is stored in "Search Action Information" has been described, actually stored is information indicating which user has searched with what query and when.

(Control Unit 130)

The control unit 130 is a controller and is implemented by, for example, a CPU, an MPU, or the like executing various programs stored in a storage device inside the information processing apparatus 100 using a RAM as a work area. Furthermore, the control unit 130 is implemented by, for example, an integrated circuit such as an ASIC or an FPGA.

As illustrated in FIG. 6, the control unit 130 includes an acquisition unit 131, a specifying unit 132, a generation unit 133, a processing unit 134, and a provision unit 135 and implements or executes an action of information processing described below. Note that the internal configuration of the control unit 130 is not limited to the configuration illustrated in FIG. 6 and may be another configuration as long as the information processing to be described later is performed.

(Acquisition Unit 131)

The acquisition unit 131 acquires various types of information from the storage unit 120. The acquisition unit 131 further stores the acquired various types of information in the storage unit 120.

The acquisition unit 131 acquires various types of information from an external information processing apparatus. The acquisition unit 131 acquires various types of information from another information processing apparatus such as the terminal device 10.

The acquisition unit 131 acquires, for example, operation information performed by the administrator. For example, the acquisition unit 131 acquires information regarding a query (such as information indicating a predetermined query) specified by the administrator to determine a reference query.

(Specifying Unit 132)

The specifying unit 132 specifies, for example, search queries of a plurality of users who have used the reference query for a search on the basis of the information acquired by the acquisition unit 131. In other words, for example, the specifying unit 132 specifies another search query input for a search by a plurality of users who have input the reference query as a search query.

For example, the specifying unit 132 specifies the search date and time when the search query has been used for a search using the search date and time of the reference query as a reference date and time on the basis of the information acquired by the acquisition unit 131. For example, the specifying unit 132 specifies a relative search date and time of the search query with respect to the reference date and time.

(Generation Unit 133)

For example, the generation unit 133 generates time-series information indicating the time series of the search queries on the basis of the search queries and the search date and time specified by the specifying unit 132.

(Processing Unit 134)

The processing unit 134 causes generative AI to classify the time-series information of the search queries into phases by, for example, inputting the time-series information generated by the generation unit 133 to the generative AI such as the GPT model. In other words, for example, the processing unit 134 causes the generative AI to classify the search queries arranged in time series into phases. Furthermore, the processing unit 134 causes the generative AI to execute phase classification by, for example, inputting a prompt instructing phase classification to the generative AI together with the time-series information. For example, the processing unit 134 causes the generative AI to execute the phase classification by inputting a prompt for instructing phase classification depending on a change in the user's behavior or intention to the generative AI. Furthermore, for example, the processing unit 134 causes the generative AI to execute phase classification by inputting, to the generative AI, a prompt instructing to perform phase classification such that a relevance score between adjacent phases is high.

The processing unit 134 causes the generative AI to generate the description content (title, summary, or the like) describing the phases by, for example, inputting the time-series information generated by the generation unit 133 to generative AI such as the GPT model. Furthermore, the processing unit 134 causes the generative AI to generate the description content by, for example, inputting, to the generative AI, a prompt instructing generation of the description content together with the time-series information. For example, the processing unit 134 causes the generative AI to execute generation of the description content by inputting, to the generative AI, a prompt for instructing generation of the description content reflecting the information regarding search queries included in each phase indicated by the phase classification result.

(Provision Unit 135)

The provision unit 135 provides, for example, the phase classification result and the description content generated by the processing unit 134 to the administrator who has specified the reference query. For example, the provision unit 135 provides information for displaying the phase classification result generated by the processing unit 134 and the description content. For example, the provision unit 135 provides information for displaying the description content to be superimposed on the phase classification result.

[5. Flow of Information Processing]

Next, a procedure of information processing by the information processing system 1 according to the embodiment will be described with reference to FIG. 8. FIG. 8 is a flowchart illustrating the procedure of information processing by the information processing system 1 according to the embodiment.

As illustrated in FIG. 8, the information processing apparatus 100 specifies search queries of a plurality of users who has used a reference query (corresponding to the predetermined query) for a search (step S201).

The information processing apparatus 100 generates time-series information of the search queries on the basis of the information regarding the specified search queries (step S202).

The information processing apparatus 100 inputs the generated time-series information to the generative AI to cause the generative AI to execute phase classification and generation of the description content (step S203).

The information processing apparatus 100 provides information for displaying the phase classification result and the description content (step S204).

[6. Effects]

As described above, the information processing apparatus 100 according to the embodiment includes the specifying unit 132, the processing unit 134, and the provision unit 135. The specifying unit 132 specifies search queries of a plurality of users who has used a predetermined query for a search. The processing unit 134 causes generative AI to classify the search queries into a plurality of phases and to generate description content describing the phase for each of the phases by inputting information regarding the search queries specified by the specifying unit 132 to the generative AI The provision unit 135 provides information for displaying information indicating the plurality of phases classified by the generative AI together with the description content generated by the generative AI.

As a result, the information processing apparatus 100 according to the embodiment can display the description content together with the phase classification result, for example, and thus can appropriately visualize the phase classification of the search queries. Furthermore, the information processing apparatus 100 according to the embodiment can analyze the relationship between the user and the target indicated by the predetermined query, for example, and thus can enable appropriate trend analysis of the users.

In addition, the processing unit 134 causes the generative AI to execute classification and generation by inputting time-series information indicating time series of searches in which the search queries have been used for a search to the generative AI using a search date and time when the predetermined query has been used for the search as reference date and time.

As a result, the information processing apparatus 100 according to the embodiment can enable appropriate trend analysis of the users in chronological order, for example.

Furthermore, the processing unit 134 causes the generative AI to execute classification and generation by inputting a prompt for instructing classification of phases depending on changes in the behavior of a plurality of users to the generative AI.

As a result, the information processing apparatus 100 according to the embodiment can enable appropriate trend analysis of the users depending on a change in behavior, for example.

In addition, the processing unit 134 causes the generative AI to execute classification and generation by inputting, to the generative AI, a prompt instructing to classify the phases such that a relevance score between adjacent phases is high.

As a result, the information processing apparatus 100 according to the embodiment can perform phase classification such that a continuous relationship is deepened, instead of an instantaneous relationship as described in media such as broadcast media, thereby enabling more appropriate trend analysis to be performed.

Furthermore, the processing unit 134 causes the generative AI to execute classification and generation by inputting, to the generative AI, a prompt instructing to generate the description content reflecting information regarding the search queries included in the phases.

As a result, the information processing apparatus 100 according to the embodiment can display the description content for each of the phases, for example, and thus can enable more appropriate trend analysis.

In addition, the provision unit 135 provides information indicating an alert in a case where there are phases in which the relevance score between adjacent phases among the plurality of phases is less than or equal to a predetermined threshold.

As a result, the information processing apparatus 100 according to the embodiment can notify an alert in a case where the continuous relationship of the phases is low, for example, and thus can enable more appropriate trend analysis.

[7. Hardware Configuration]

Meanwhile, the information processing apparatus 100 according to the above-described embodiment is implemented by, for example, the computer 1000 having a configuration as illustrated in FIG. 9. FIG. 9 is a hardware configuration diagram illustrating an example of a computer that implements functions of the information processing apparatus 100. The computer 1000 includes a CPU 1100, a RAM 1200, a ROM 1300, an HDD 1400, a communication interface (I/F) 1500, an input and output interface (I/F) 1600, and a media interface (I/F) 1700.

The CPU 1100 operates on the basis of a program stored in the ROM 1300 or the HDD 1400 and controls each unit.

The ROM 1300 stores a boot program executed by the CPU 1100 when the computer 1000 is activated, a program depending on hardware of the computer 1000, and others.

The HDD 1400 stores the program executed by the CPU 1100, data used by the program, and others. The communication interface 1500 acquires data from another device via a predetermined communication network, sends the data to the CPU 1100, and transmits the data generated by the CPU 1100 to another device via a predetermined communication network.

The CPU 1100 controls output devices such as a display and a printer and input devices such as a keyboard and a mouse via the input and output interface 1600. The CPU 1100 acquires data from the input device via the input and output interface 1600. In addition, the CPU 1100 outputs the generated data to the output device via the input and output interface 1600.

The media interface 1700 reads a program or data stored in a recording medium 1800 and provides the program or data to the CPU 1100 via the RAM 1200. The CPU 1100 loads the program from the recording medium 1800 onto the RAM 1200 via the media interface 1700 and executes the loaded program. The recording medium 1800 is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 100 according to the embodiment, the CPU 1100 of the computer 1000 implements the function of the control unit 130 by executing a program loaded on the RAM 1200. The CPU 1100 of the computer 1000 reads and executes these programs from the recording medium 1800; however, as another example, these programs may be acquired from another device via a predetermined communication network.

[8. Others]

Among the processing described in the above embodiments, the whole or a part of the processing described as being performed automatically can be performed manually, or the whole or a part of the processing described as being performed manually can be performed automatically by a known method. In addition, the processing procedure, specific names, and information including various types of data and parameters described herein or illustrated in the drawings can be modified as desired unless otherwise specified. For example, the various types of information illustrated in the drawings are not limited to the illustrated information.

In addition, each component of each device illustrated in the drawings is functionally conceptual and is not necessarily physically configured as illustrated in the drawings. That is, a specific form of distribution and integration of each device is not limited to the illustrated form, and all or a part thereof can be functionally or physically distributed and integrated in any unit depending on various loads, use conditions, and others.

In addition, the above-described embodiments can be combined as appropriate within a range in which the processing contents do not contradict each other.

Although some of the embodiments of the present application have been described above in detail with reference to the drawings, these are merely examples, and the present invention can be implemented in other forms in which various modifications or improvements are made on the basis of the knowledge of those skilled in the art in addition to the modes described in the disclosure of the invention.

In addition, the terms of "section, module, and unit" can be rephrased as "means", "circuit", or the like. For example, the acquisition unit can be rephrased as an acquisition means or an acquisition circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a central processing unit (CPU) configured to specify search queries of a plurality of users who have used a predetermined query for a search;
the CPU causing generative AI to classify the search queries into a plurality of phases and to generate description content describing the phase for each of the phases by inputting information regarding the search queries specified by the CPU to the generative AI;
the CPU providing information for displaying information indicating the plurality of phases classified by the generative AI together with the description content generated by the generative AI; and
the CPU providing information indicating an alert in a case where, among the plurality of phases, there are adjacent phases having a relevance score between the adjacent phases less than or equal to a predetermined threshold.

2. The information processing apparatus according to claim 1, wherein the CPU
causes the generative AI to execute the classification and the generation by inputting time-series information indicating time series of searches in which the search queries have been used for a search to the generative AI with a search date and time when the predetermined query has been used for the search as a reference date and time.

3. The information processing apparatus according to claim 1, wherein the CPU
causes the generative AI to execute the classification and the generation by inputting, to the generative AI, a prompt instructing to classify phases depending on a change in behaviors of the plurality of users.

4. The information processing apparatus according to claim 1, wherein the CPU
causes the generative AI to execute the classification and the generation by inputting, to the generative AI, a prompt instructing to classify phases such that a relevance score between adjacent phases is high.

5. The information processing apparatus according to claim 1, wherein the CPU
causes the generative AI to execute the classification and the generation by inputting, to the generative AI, a prompt instructing to generate the description content reflecting information regarding the search queries included in the phases.

6. The information processing apparatus according to claim 1, wherein the CPU specifies conversions of a plurality of users who have performed a predetermined conversion, and the CPU causes the generative AI to classify the conversions into the plurality of phases by inputting information regarding a time difference between the predetermined conversion and conversions performed before or after the predetermined conversion to the generative AI.

7. The information processing apparatus according to claim 1, wherein the CPU specifies purchased products of a plurality of users who have purchased a predetermined product, and the CPU causes the generative AI to classify the purchased products into the plurality of phases by inputting information regarding a time difference between the predetermined product and purchased products purchased before or after the predetermined product to the generative AI.

8. The information processing apparatus according to claim 1, wherein the CPA specifies selected advertisements of a plurality of users who have selected a predetermined advertisement, and the CPU causes the generative AI to classify the selected advertisements into the plurality of phases by inputting information regarding a time difference between the predetermined advertisement and selected advertisements selected before or after the predetermined advertisement to the generative AI.

9. The information processing apparatus according to claim 1, wherein the CPU specifies search queries by narrowing down to a plurality of users who have performed a search using the predetermined query a predetermined number of times or more.

10. The information processing apparatus according to claim 1, wherein the CPU provides information for displaying the description content superimposed on a scatter diagram indicating the plurality of phases, wherein a vertical axis of the scatter diagram represents a score reflecting a number of searches by the search queries and a horizontal axis represents time.

11. An information processing method executed by a computer, the method comprising:

specifying search queries of a plurality of users who has used a predetermined query for a search;

causing generative AI to classify the search queries into a plurality of phases and to generate description content describing the phase for each of the phases by inputting information regarding the search queries specified in the specifying to the generative AI; and providing information for displaying information indicating the plurality of phases classified by the generative AI together with the description content generated by the generative AI; and providing information indicating an alert in a case where, among the plurality of phases, there are adjacent phases having a relevance score between the adjacent phases less than or equal to a predetermined threshold.

12. The information processing method according to claim 11, the method further comprising:

causing the generative AI to execute the classification and the generation by inputting time-series information indicating time series of searches in which the search queries have been used for a search to the generative AI with a search date and time when the predetermined query has been used for the search as a reference date and time.

13. The information processing method according to claim 11, the method further comprising:

causing the generative AI to execute the classification and the generation by inputting, to the generative AI, a prompt instructing to classify phases depending on a change in behaviors of the plurality of users.

14. The information processing method according to claim 11, the method further comprising:

causing the generative AI to execute the classification and the generation by inputting, to the generative AI, a prompt instructing to classify phases such that a relevance score between adjacent phases is high.

15. The information processing method according to claim 11, the method further comprising:

causing the generative AI to execute the classification and the generation by inputting, to the generative AI, a prompt instructing to generate the description content reflecting information regarding the search queries included in the phases.

16. A non-transitory computer-readable storage medium storing an information processing program for causing a computer to execute:

specifying search queries of a plurality of users who has used a predetermined query for a search;

causing generative AI to classify the search queries into a plurality of phases and to generate description content describing the phase for each of the phases by inputting information regarding the search queries specified in the specifying procedure to the generative AI;

providing information for displaying information indicating the plurality of phases classified by the generative AI together with the description content generated by the generative AI; and providing information indicating an alert in a case where, among the plurality of phases, there are adjacent phases having a relevance score between the adjacent phases less than or equal to a predetermined threshold.

17. The non-transitory computer-readable storage medium according to claim 16, the method further comprising:

causing the generative AI to execute the classification and the generation by inputting time-series information indicating time series of searches in which the search queries have been used for a search to the generative AI with a search date and time when the predetermined query has been used for the search as a reference date and time.

18. The non-transitory computer-readable storage medium according to claim 16, the method further comprising:

causing the generative AI to execute the classification and the generation by inputting, to the generative AI, a prompt instructing to classify phases depending on a change in behaviors of the plurality of users.

19. The non-transitory computer-readable storage medium according to claim 16, the method further comprising:

causing the generative AI to execute the classification and the generation by inputting, to the generative AI, a prompt instructing to classify phases such that a relevance score between adjacent phases is high.

20. The non-transitory computer-readable storage medium according to claim 16, the method further comprising:

causing the generative AI to execute the classification and the generation by inputting, to the generative AI, a prompt instructing to generate the description content reflecting information regarding the search queries included in the phases.

\* \* \* \* \*